(12) United States Patent
Kawahara et al.

(10) Patent No.: US 6,958,797 B2
(45) Date of Patent: Oct. 25, 2005

(54) OPTICAL FILM HAVING LOW CHROMATICITY VARIATION AND QUARTER WAVELENGTH PLATE, AND LIQUID CRYSTAL DISPLAY USING THE SAME

(75) Inventors: Satoru Kawahara, Ibaraki (JP); Naoki Takahashi, Ibaraki (JP); Hironori Motomura, Ibaraki (JP); Ikuo Kawamoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 83 days.

(21) Appl. No.: 10/623,590

(22) Filed: Jul. 22, 2003

(65) Prior Publication Data

US 2004/0125291 A1 Jul. 1, 2004

(30) Foreign Application Priority Data

Jul. 23, 2002 (JP) .................................. 2002-214340
Jul. 23, 2002 (JP) .................................. 2002-214341

(51) Int. Cl.[7] .......................................... G02F 1/1335
(52) U.S. Cl. ...................... 349/115; 349/117; 349/118; 349/119; 349/120
(58) Field of Search .......................... 349/115, 117–121

(56) References Cited

U.S. PATENT DOCUMENTS

| | | | |
|---|---|---|---|
| 5,560,864 A | 10/1996 | Goulding | 252/299.01 |
| 5,709,946 A | 1/1998 | Jackson et al. | 428/413 |
| 5,833,880 A | 11/1998 | Siemensmeyer et al. | 252/299.64 |
| 6,342,934 B1 * | 1/2002 | Kameyama et al. | 349/98 |
| 6,400,433 B1 * | 6/2002 | Arakawa et al. | 349/117 |
| 6,433,853 B1 | 8/2002 | Kameyama et al. | 349/176 |
| 6,519,017 B1 * | 2/2003 | Ichihashi et al. | 349/117 |
| 6,565,974 B1 | 5/2003 | Uchiyama et al. | 428/412 |
| 6,812,983 B2 * | 11/2004 | Arakawa | 349/117 |

FOREIGN PATENT DOCUMENTS

| | | |
|---|---|---|
| EP | 0 261 712 | 3/1988 |
| EP | 1 160 591 | 12/2001 |
| GB | 2 280 445 | 2/1995 |
| JP | 8-239496 | 9/1996 |
| JP | 11-248941 | 9/1999 |
| JP | 2001-55455 | 2/2001 |
| JP | 2001-343529 | 12/2001 |
| JP | 2002-174724 | 6/2002 |
| WO | WO 93/22397 | 11/1993 |
| WO | WO 98/00428 | 1/1998 |
| WO | WO 00/26705 | 5/2000 |
| WO | WO 01/37007 | 5/2001 |

* cited by examiner

Primary Examiner—Andrew Schechter
(74) Attorney, Agent, or Firm—Westerman, Hattori, Daniels & Adrian LLP

(57) ABSTRACT

An optical film in which a function of a brightness enhancement film is maintained and variations in brightness and chromaticity within a film plane are suppressed is provided. An optical film is a laminate of an absorptive dichroic polarizing plate and a brightness enhancement film. A maximum chromaticity difference Δxy(max) of in-plane transmitted light is 0.008 or smaller after the optical film is attached to a glass plate and allowed to stand at 70° C. for 120 hours. The brightness enhancement film includes a layer having a circularly polarized light separating function, and a quarter wavelength plate. The quarter wavelength plate is a film showing an in-plane retardation (Δnd) satisfying Δnd(450 nm)/Δnd(550 nm)<1.02 or a film containing a polymer having a photoelastic coefficient of $40 \times 10^{-12}$ $m^2/N$ or smaller.

15 Claims, 2 Drawing Sheets

OPTICAL FILM HAVING LOW CHROMATICITY VARIATION AND QUARTER WAVELENGTH PLATE, AND LIQUID CRYSTAL DISPLAY USING THE SAME

The present application claims priority of Japanese applications Nos. 2002-214340 and 2002-214341, which are hereby incorporated by reference.

BACKGROUND OF THE INVENTION

1. Field of the Invention

The present invention relates to an optical film used in various image display apparatus such as liquid crystal displays (LCDs). More specifically, the present invention relates to a laminated polarizing plate with a brightness enhancement film and various image display apparatus using the same.

2. Description of Related Art

Conventionally, polarizing plates often have been used in liquid crystal displays, and the demand therefor has been increasing rapidly. Furthermore, in recent years, high-value-added polarizing plates such as those having an optically compensating function have come into use. There has been expanding expectations for better display quality in terms of, for example, hue, brightness, contrast and viewing angle.

For the purpose of enhancing brightness among the above, a brightness enhancement film is used together with the polarizing plate. The brightness enhancement film usually is arranged between a backlight unit and a polarizing film in a liquid crystal display, and reflects and reuses light that is otherwise absorbed in the polarizing film, thereby enhancing the brightness of a display screen. As such a brightness enhancement film, for example, a laminate of polymer films having birefringence, a cholesteric liquid crystal film, etc. are known. In general, the laminate of polymer films reflects linearly polarized light, while the cholesteric liquid crystal film reflects circularly polarized light.

The cholesteric liquid crystal film is used, for example, as a laminate with a quarter wavelength plate, which is a retardation plate. With this laminate, the cholesteric liquid crystal film first separates light from a backlight into right-circularly polarized light and left-circularly polarized light and transmits one of these circularly polarized lights, and the laminated quarter wavelength plate converts it into linearly polarized light, thus supplying it to the polarizing plate. On the other hand, the light reflected by the cholesteric liquid crystal film is led to, for example, a reflection plate disposed at the back of the backlight where its polarization state is changed, returns to the cholesteric liquid crystal film so as to be separated further (see JP 11(1999)-248941 A, for example).

As described above, by combining the brightness enhancement film with the polarizing plate, it is possible to enhance brightness characteristics of the liquid crystal display. However, there are problems as well, which will be described below.

The polarizing plate, generally called an absorptive dichroic polarizing plate, is usually produced by allowing a polyvinyl alcohol (in the following, abbreviated as "PVA") film to adsorb iodine or a dichroic dye, followed by stretching to prepare a polarizing film, and then laminating protective films such as triacetylcellulose (TAC) on both surfaces of this polarizing film. Because of this stretching process, a tensile stress remains inside the polarizing film. It is known that this stress causes shrinkage of the film under a heating or high-temperature humidifying condition. The brightness enhancement film is laminated on the backlight side of the polarizing plate. Therefore, an increase in temperature inside a liquid crystal panel, for example, causes the shrinkage of the polarizing plate, and this shrinkage force acts on the brightness enhancement film, so that changes in optical characteristics such as a retardation change occur in a retardation plate (for example, the quarter wavelength plate) serving as a constituent member of the brightness enhancement film. The changes in optical characteristics of the retardation plate bring about changes in the property of the brightness enhancement film. As a result, the problem arises in that the brightness, hue and chromaticity variations occur in the display screen of the liquid crystal display.

In order to solve such a problem, (1) a method of reducing changes in dimension of the polarizing plate and (2) a method of interposing between the polarizing plate and the brightness enhancement film a layer for alleviating the shrinkage force acting on the brightness enhancement film can be considered, for example. However, even after the changes in dimension of the polarizing plate are reduced, the problem of retardation change cannot be solved if the dimension of the retardation plate changes considerably. Also, interposing the other layer goes against the need for lighter weight and thinner apparatus in recent years. On the other hand, not only the dimensional change of the polarizing plate causes the problem, but also the brightness enhancement film itself may be affected by the heating or high-temperature humidifying.

SUMMARY OF THE INVENTION

With the foregoing in mind, it is an object of the present invention to provide an optical film that can suppress functional changes in a brightness enhancement film in a polarizing plate provided with the brightness enhancement film including a quarter wavelength plate and, accordingly, suppress variation in chromaticity in a display screen when this optical film is used in a liquid crystal display or the like.

In order to achieve the above-mentioned object, an optical film of the present invention includes a polarizing plate, and a brightness enhancement film, and satisfies the condition below. A maximum chromaticity difference $\Delta xy$ (max) of in-plane transmitted light of the optical film is 0.008 or smaller after the optical film is attached to a glass plate and allowed to stand at 70° C. for 120 hours.

In the present application, a "chromaticity difference" refers to a difference ($\Delta xy$) between chromaticity (x and y) of the optical film, and a "maximum chromaticity difference" refers to a largest chromaticity difference ($\Delta xy(max)$) in the optical film. Further, "in-plane" in the "in-plane transmitted light" does not mean an arbitrary point in the optical film but means all points therein, and the largest chromaticity difference among the chromaticity differences at all points is the "maximum chromaticity difference," which is required to be 0.008 or smaller here. For example, when the chromaticity is measured at 9 points in a plane, the difference between the maximum value and the minimum value among the measurement values of 9 points corresponds to $\Delta xy(max)$.

The inventors studied keenly a brightness enhancement film used in combination with a polarizing plate, in particular, a brightness enhancement film including a layer having a circularly polarized light separating (reflecting) function and a quarter wavelength plate (in the following, referred to as a "$\lambda/4$ plate"). It was then found that, by using as the $\lambda/4$ plate (1) a film having predetermined wavelength dispersion characteristics or (2) a film having a predetermined photoelastic coefficient, it was possible to suppress down to 0.008 or smaller the maximum chromaticity difference ($\Delta xy(max)$) of an optical film including the brightness enhancement film and the polarizing plate after treated in the above-mentioned condition, as detailed below. An optical film with such a property can be used as an excellent polarizing plate with a brightness enhancement film having very small chromaticity and brightness variations even under a heating or humidifying condition when this optical film is arranged in various image display apparatus such as liquid crystal displays.

DESCRIPTION OF THE PREFERRED EMBODIMENTS

Figure 1:
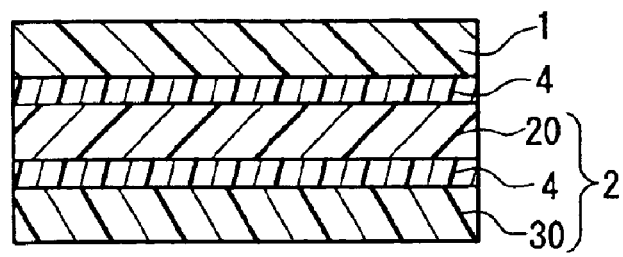
FIG. 1 shows a cross-section of an optical film according to an embodiment of the present invention.

As described above, an optical film of the present invention includes a polarizing plate and a brightness enhancement film, wherein a maximum chromaticity difference $\Delta xy(max)$ of in-plane transmitted light of the optical film is 0.008 or smaller after the optical film is attached to a glass plate and allowed to stand at 70° C. for 120 hours. The $\Delta xy(max)$ preferably is 0.005 or smaller, more preferably is 0.003 or smaller, and particularly preferably is 0 to 0.003.

The maximum chromaticity difference $\Delta xy(max)$ of the optical film can be measured as follows, for example. However, it should be noted that this measuring method is used only for determining the maximum chromaticity difference $\Delta xy(max)$ of the optical film and by no means limits a method for manufacturing an optical film of the present invention, a use or an application of the optical film etc.

First, a 307 mm×230 mm optical film of the present invention is attached to a 310 mm×260 mm glass plate having a thickness of 1.1 mm with an acrylic pressure sensitive adhesive. At this time, in the optical film, the polarizing plate or the brightness enhancement film may face the glass plate, for example, but it is preferable that the polarizing plate faces the glass plate. Next, this laminate is allowed to stand under a heating condition of 70° C. for 120 hours (the humidity is kept 10% or lower). Then, the resultant laminate is measured for chromaticity (x and y) of in-plane transmitted light, and the measurement value (chromaticity x, y) is substituted into the formula below, thereby calculating an in-plane maximum chromaticity difference ($\Delta xy(max)$). The above-noted chromaticity can be measured, for example, on the side of the glass plate using a brightness measuring instrument such as trade name BM-5A (manufactured by TOPCON CORPORATION). In the optical film with the above-mentioned size, the chromaticity is measured at 9 to 25 points in total. 1 to 8 measurement points, preferably 2 to 8 measurement points are set for every 8000 mm$^2$.

It is preferable that the brightness enhancement film includes a layer having a circularly polarized light separating (reflecting) function (in the following, referred to as a circularly polarized light separation layer) and a λ/4 plate, as mentioned above.

In the present invention, the circularly polarized light separating (reflecting) function refers to a function of transmitting selectively one of right-circularly polarized light and left-circularly polarized light and reflecting selectively the other. Also, the "λ/4 plate" is a kind of retardation plates as described above, and has a function of converting circularly polarized light or elliptically polarized light into linearly polarized light or converting linearly polarized light into circularly polarized light or elliptically polarized light. The brightness enhancement film including the above also is called a reflective polarizer based on its function.

In order to set the optical film of the present invention to have the maximum chromaticity difference $\Delta xy(max)$ ≦0.008, it is appropriate to use the λ/4 plate of the present invention described below, namely, either a first λ/4 plate or a second λ/4 plate as a constituent member of the brightness enhancement film.

First, an example of the first λ/4 plate in the present application will be described. The first λ/4 plate can be a film whose in-plane retardation ($\Delta nd$) with respect to incident light from a normal direction satisfies the formula (I) below.

$$\Delta nd(450\ nm)/\Delta nd(550\ nm) \leq 1.02 \quad (I)$$

In the above formula (I), $\Delta nd$ is $(nx-ny) \cdot d$, nx and ny respectively represent refractive indices in an X-axis direction and a Y-axis direction in the λ/4 plate, with the X-axis direction being an axial direction exhibiting a maximum refractive index within a plane of the λ/4 plate and the Y-axis direction being an axial direction perpendicular to the X axis within the plane, d represents a thickness of the λ/4 plate, $\Delta nd(450\ nm)$ represents an in-plane retardation at a wavelength of 450 nm, and $\Delta nd(550\ nm)$ represents an in-plane retardation at a wavelength of 550 nm.

When a conventional polymer film having wavelength dispersion characteristics of $\Delta nd(450\ nm)/\Delta nd(550\ nm) > 1.02$ is used as the λ/4 plate, a change in its retardation hinders light from being converted into linearly polarized light over a wide wavelength range, which would pose a problem of greatly affecting the characteristics of the brightness enhancement film including the λ/4 plate. Especially in the case of a polymer film as described above, an increase in the retardation causes the film to transmit less light with wavelengths of 400 to 500 nm (blue) or to transmit more light with wavelengths of 600 nm or longer. This increases changes in transmitted light accompanied by the variation of retardation. On the other hand, by using a film achieving $\Delta nd(450\ nm)/\Delta nd(550\ nm) \leq 1.02$ as shown in the above formula (I) as the λ/4 plate as in the present invention, it is possible to maintain the function of converting light into linearly polarized light over a wide wavelength range even when the retardation changes. In other words, since the transmittance over the entire wavelength range, for example, does not change even when the retardation varies, it becomes possible to suppress changes in transmitted light (changes in color). Consequently, even when the dimension of the absorptive dichroic polarizing plate changes, the characteristics of the brightness enhancement film including the λ/4 plate is less affected, and therefore, the above-described problems during heating (for example, chromaticity variation) is suppressed.

It is preferable that the λ/4 plate has reciprocal wavelength dispersion characteristics. Wavelength dispersion characteristics show the relationship between wavelengths and retardation and usually have a tendency that the retardation decreases as the wavelength becomes longer. The reciprocal wavelength dispersion characteristics show a tendency that the retardation increases as the wavelength becomes longer.

The $\Delta nd(450\ nm)/\Delta nd(550\ nm)$ is not particularly limited as long as it is 1.02 or smaller, and for example, is 1.01 or smaller, preferably, ranges from 1.01 to 0.80, more preferably, ranges from 1.00 to 0.80. It should be noted that, when $\Delta nd(450\ nm)/\Delta nd(550\ nm)$ exceeds 1.02, it is impossible to convert light into linearly polarized light over a wide wavelength range, in other words, the function of the λ/4 plate cannot be maintained.

When the λ/4 plate is viewed from an oblique direction, a larger retardation thereof is generated, and the influence of the wavelength dispersion characteristics thereof also becomes larger. Therefore, it is preferable that the range shown below is satisfied. The λ/4 plate satisfying the formula (I) mentioned above preferably has an in-plane retardation (Δnd') with respect to incident light from a direction inclined by 45° from a normal direction that satisfies the formula (II) below, more preferably is 1.02 or smaller, particularly preferably ranges from 1.02 to 0.80.

$$\Delta nd'(450\ nm)/\Delta nd'(550\ nm) \leq 1.04 \quad (II)$$

In the above formula (II), Δnd' is (nx'−ny')·d, nx' and ny' respectively represent refractive indices in an X'-axis direction and a Y'-axis direction with respect to the incident light from the direction inclined by 45° from the normal direction (a Z'-axis direction) of the λ/4 plate, with the X'-axis direction being an axial direction within a plane of the λ/4 plate perpendicular to an incident direction of the incident light inclined by 45° from the Z'-axis direction and the Y'-axis direction being a direction perpendicular to the incident direction and the X'-axis direction, d represents a thickness of the λ/4 plate, Δnd' (450 nm) represents an in-plane retardation at a wavelength of 450 nm, and Δnd' (550 nm) represents an in-plane retardation at a wavelength of 550 nm.

The present invention is characterized by the use of a λ/4 plate satisfying the formula (I), the formula (II) or the formulae (I) and (II) as the first λ/4 plate. Anyone having an ordinary skill in the art can prepare such a λ/4 plate satisfying these formulae based on the teachings of the present invention and a common technical knowledge at the time of filing without conducting any undue experimentation. Additionally, such a λ/4 plate may have a single layer structure or a laminated structure including two or more layers as long as it satisfies the above-noted conditions.

As long as the first λ/4 plate satisfies the formula (I), its material is not limited particularly but can be, for example, any of norbornene-based, cycloolefin-based, cellulose-based and polycarbonate-based polymers that can be used in a retardation film, or a modified polymer thereof. Among the above, a modified polycarbonate-based polymer, a norbornene-based polymer, a cycloolefin-based polymer and a cellulose-based polymer are preferable, and a modified polycarbonate-based polymer is more preferable. Also, a transparent polymer with a photoelastic coefficient of $40 \times 10^{-12}\ m^2/N$ or smaller, which will be described in the second λ/4 plate, can be used. These polymers may be used alone or in combination.

The polymer satisfying the formula (I) may be produced by a conventionally known method or be a commercially available product. Examples of such a commercially available product include trade name ARTON (manufactured by JSR Corporation), trade name WRF (manufactured by TEIJIN LIMITED; see WO 00/26705) and trade name ZEONOR (manufactured by ZEON Corporation).

The first λ/4 plate can be obtained, for example, by forming the above-mentioned polymers into a film by a conventionally known method, and the characteristic shown by the formula (I) can be set by a resin to be used. More specifically, the above-mentioned polymers can be formed into a film, which then is stretched uniaxially or biaxially, thus obtaining a λ/4 plate. The retardation (the in-plane retardation and the retardation in the thickness direction) of the obtained stretched film (λ/4 plate) can be controlled by setting suitably the material for the film, the thickness of the film before being stretched, the stretching condition such as the stretching magnification and the stretching temperature, for example. The retardation can be controlled by a conventionally known method. The optical characteristics of the λ/4 plate are not particularly limited as long as the in-plane retardation is generated, but preferably show "nx>ny=nz," for example. The in-plane retardation (Δnd) shown by the equation below preferably is 90 to 170 nm, more preferably is 100 to 150 nm. The retardation in the thickness direction (Rth) shown by the equation below preferably is 90 to 170 nm, more preferably is 100 to 150 nm. In the equation below, nx, ny and nz indicate refractive indices in an X-axis direction, a Y-axis direction and a Z-axis direction in the λ/4 plate, with the X-axis direction being an axial direction exhibiting a maximum refractive index within a plane of the λ/4 plate, the Y-axis direction being an axial direction perpendicular to the X axis within the plane and the Z-axis direction being a thickness direction perpendicular to the X axis and the Y axis, and d represents a thickness of the λ/4 plate. In this case, the refractive index usually is a value at a wavelength of 590 nm.

$$\Delta nd = (nx-ny) \cdot d$$

$$Rth = [\{(nx-ny)/2\} - nz] \cdot d$$

The first λ/4 plate may be a laminate as described above and can be manufactured by laminating two or more polymer films, for example. By this lamination, the first λ/4 plate is given reciprocal wavelength dispersion characteristics and set to satisfy the above-noted formula (I) according to a conventionally known method. At this time, two or more retardation films with the same or different retardation may be laminated. More specifically, polymer films as described in the following can be combined.

The first λ/4 plate as a laminate can be, for example, a combination of a retardation film satisfying the formula (III) below and a liquid crystal layer satisfying the formula (IV) below. Also by combining them, a λ/4 plate having reciprocal wavelength dispersion characteristics shown by the formula (I) and further the formula (II) can be prepared.

$$nx^r > ny^r = nz^r \quad (III)$$

$$nz^c > nx^c 24\ ny^c \quad (IV)$$

In the formulae (III) and (IV), "$nx^r$, $ny^r$, $nz^r$" and "$nx^c$, $ny^c$, $nz^c$" indicate refractive indices in an X-axis direction, a Y-axis direction and a Z-axis direction in the retardation film and the liquid crystal layer, respectively, with the X-axis direction being an axial direction exhibiting a maximum refractive index within a plane of the retardation film or the liquid crystal layer, the Y-axis direction being an axial direction perpendicular to the X axis within the plane and the Z-axis direction being a thickness direction perpendicular to the X axis and the Y axis.

The retardation film satisfying the formula (III) can be used, for example, as a film that mainly converts circularly polarized light into linearly polarized light, while the liquid crystal layer satisfying the formula (IV) can be used, for example, as a liquid crystal layer for compensating for coloring of the circularly polarized light separation layer when viewed in an oblique direction. The liquid crystal layer satisfying the formula (IV) may be replaced with a polymer film as long as it satisfies the formula (IV), but the liquid crystal layer is preferable because of its thinness.

The retardation film satisfying the formula (III) can be manufactured by subjecting a polymer film to a stretching treatment similarly to the above, and its optical characteristics also can be controlled by a conventionally known method. Examples of the material for the polymer film include polyethylene terephthalate, polyamide, liquid crystal polymers, polymethyl methacrylate, polyvinyl chloride, polyvinylidene chloride, polystyrene, PVA, polyolefins such as polycarbonate, polysulfone, polyarylate, polyethersulfone, polyethylene and polypropylene, and cellulose acetate-based polymers such as TAC. Other than the above, a polymer presenting the above-mentioned photoelastic coefficient also can be used. These polymers may be used alone or in combination.

On the other hand, the liquid crystal layer satisfying the formula (IV) also can be prepared by a conventionally known method. The material therefor is not particularly limited but can be any known liquid crystal materials, for example, a nematic liquid crystal, in particular, a nematic liquid crystal polymer. The nematic liquid crystal polymer is not particularly limited but can be any conventionally known polymers, for example, the polymer described in JP 2002-174724 A.

The optical characteristics of the liquid crystal layer shown by the formula (IV) can be controlled by a conventionally known method, for example, by adjusting a form of orientation. More specifically, in the formula (IV), especially the liquid crystal layer presenting "$nz^c > nx^c \approx ny^c$" can be, for example, a film obtained by vertically aligning a liquid crystal, while the liquid crystal layer presenting "$nz^c > nx^c > ny^c$" can be, for example, an incline-oriented film, which can be a commercially available product such as trade name NH film (NIPPON OIL CORPORATION).

The first λ/4 plate formed of the retardation film and the liquid crystal layer as described above can be manufactured by a conventionally known method, for example, by attaching the above to each other. The liquid crystal layer can be manufactured, for example, by applying the nematic liquid crystal polymer to an alignment base and hardening the applied film.

In the case where the first λ/4 plate is formed of the retardation film and the liquid crystal layer as described above, the thickness of the retardation film ranges, for example, from 10 to 200 μm, preferably from 10 to 120 μm, and more preferably from 10 to 100 μm. On the other hand, the thickness of the liquid crystal layer ranges, for example, from 0.1 to 20 μm, preferably from 0.1 to 10 μm, and more preferably from 1 to 5 μm.

The following is a description of a second λ/4 plate of the present invention. The second λ/4 plate can be a film containing a polymer with a photoelastic coefficient of $40 \times 10^{-12}$ m$^2$/N or smaller. Similarly to the above, the photoelastic coefficient preferably is $20 \times 10^{-12}$ m$^2$/N or smaller, and more preferably is $2 \times 10^{-12}$ to $15 \times 10^{-12}$ m$^2$/N. In a brightness enhancement film using the λ/4 plate formed of the polymer having such a photoelastic coefficient, even when the dimension of the absorptive dichroic polarizing plate changes due to heating, the retardation does not vary easily, so that the function of the λ/4 plate can be maintained. Consequently, the above-described problems (for example, variation in chromaticity) can be suppressed.

The photoelastic coefficient is represented by the formula below, where C indicates a photoelastic coefficient, Δn indicates birefringence, and a indicates stress. The birefringence Δn is represented by "nx−ny," and nx and ny indicate refractive indices in an X-axis direction and a Y-axis direction in a polymer film, respectively, with the X-axis direction being an axial direction exhibiting a maximum refractive index within a plane of the film and the Y-axis direction being an axial direction perpendicular to the X axis within the plane. The photoelastic coefficient is a coefficient intrinsic to each resin.

$$C = \Delta n / \sigma$$

The kind of the polymer is not limited as long as the polymer has a photoelastic coefficient of $40 \times 10^{-12}$ m$^2$/N or smaller. For example, a polymer that has an excellent transparency, a light transmittance of 80% or higher and achieves a uniform retardation is preferable. Examples of such a polymer include polycarbonate-based polymers, polysulfone-based polymers, polyarylate-based polymers, polyethersulfone-based polymers, polyolefin-based polymers such as polyethylene and polypropylene, polymethyl methacrylate-based polymers, polyvinyl chloride-based polymers, polyvinylidene chloride-based polymers, polystyrene-based polymers, PVA, cellulose acetate-based polymers such as TAC, polyethylene terephthalate-based polymers, polyamide-based polymers, norbornene-based polymers and cycloolefin-based polymers, and modified polymers thereof More specifically, commercially available products such as trade name ARTON (manufactured by JSR Corporation), trade name WRF (manufactured by TEIJIN LIMITED; see WO 00/26705) and trade name ZEONOR (manufactured by ZEON Corporation) can be used similarly to the above. Other than the above, liquid crystal polymers such as a nematic liquid crystal polymer and a cholesteric liquid crystal polymer described above can be used. These polymers can be used alone or in combination.

The method for manufacturing the second λ/4 plate is not limited as long as a polymer having the above-mentioned photoelastic coefficient is used. As in the first λ/4 plate described above, the second λ/4 plate can be manufactured by forming the above-mentioned polymer into a film by a conventionally known method, followed by a stretching treatment, for example. In the case of using the liquid crystal polymer, a conventionally known manufacturing method also can be adopted. For example, the λ/4 plate can be manufactured by applying the liquid crystal polymer to an alignment film without any stretching treatment.

There is no particular limitation on its optical characteristics as long as it can be used as a λ/4 plate, but it is preferable to satisfy "$nx > nz \geq ny$," for example. The optical characteristics of the λ/4 plate can be adjusted by a conventionally known method, that is, setting suitably the film thickness, the stretching treatment, the stretching condition etc. similarly to the above. The in-plane retardation (Δnd) preferably is similar to that of the first λ/4 plate. In the above formula, "nx, ny, nz" indicate refractive indices in an X-axis direction, a Y-axis direction and a Z-axis direction in the second λ/4 plate (the retardation film), with the X-axis direction being an axial direction exhibiting a maximum refractive index within a plane of the retardation film, the Y-axis direction being an axial direction perpendicular to the X axis within the plane and the Z-axis direction being a thickness direction perpendicular to the X axis and the Y axis.

The thickness of the λ/4 plates illustrated above is not particularly limited but ranges, for example, from 10 to 500 μm, preferably from 20 to 200 μm, and more preferably from 20 to 100 μm, in the case where the λ/4 plate is formed of a single layer. When the λ/4 plate is a laminate, the total thickness thereof ranges, for example, from 10 to 500 μm, preferably from to 250 μm, and more preferably from 20 to 120 μm.

Further, in the case of the λ/4 plate using a liquid crystal polymer such as the above-mentioned nematic liquid crystal polymer, the thickness thereof ranges, for example, from 0.1 to 20 μm, preferably from 1 to 10 μm, and more preferably from 1 to 5 μm.

Next, an example of the circularly polarized light separation layer to be combined with the above-described λ/4 plate so as to form a brightness enhancement film will be described in the following.

The circularly polarized light separation layer is not particularly limited as long as it shows circular dichroism. It is preferably a cholesteric layer whose constituent molecules have a cholesteric structure. In the present invention, the cholesteric layer also can be called a layer having a pseudo-layer structure, so-called a planar molecular alignment or a Granjean alignment, in which the alignment of the constituent molecules have a helical structure and a screw axis of the constituent molecules is oriented substantially perpendicularly to the in-plane direction. Also, the state in which the "constituent molecules have a cholesteric structure" is not limited to the case where the liquid crystal material is fixed in the state of a cholesteric liquid crystalline phase, for example, but also includes the state where non-liquid crystalline compounds are oriented in a screwy manner as in the cholesteric liquid crystalline phase. Incidentally, this state cannot be in a liquid crystalline phase. Examples thereof include a state where a polymerizable liquid crystalline monomer is oriented in a cholesteric manner and polymerized while maintaining its orientation, so that the cholesteric orientation is fixed (the formed polymer is non-liquid crystalline). Thus, the cholesteric layer may be a liquid crystal layer or a non-liquid crystal layer as long as the constituent molecules are oriented in a cholesteric manner.

The material for forming the circularly polarized light separation layer is not particularly limited but can be a conventionally known material, preferably a liquid crystal material because it has an excellent lamination efficiency and can be formed into a thin film easily when forming the layer. A cholesteric liquid crystal is especially preferable because it allows the formation of a layer whose optical characteristics do not change very much depending on a visual angle, that is, a layer excellent in widening a viewing angle.

The liquid crystal material may have a lyotropic property or a thermotropic property, but preferably has a thermotropic property considering the simplicity in control and the easiness of mono-domain formation. Furthermore, the method for manufacturing various liquid crystal materials listed below is not particularly limited but can be a conventionally known method.

The liquid crystal material preferably has a large birefringence because the wavelength range of selective reflection can be expanded. When forming the circularly polarized light separation layer, the liquid crystal material is oriented at a temperature presenting a liquid crystalline phase, and this orientation further is fixed under a temperature condition that the liquid crystal material turns into a glass state, as detailed later. Thus, the glass transition temperature of the above-mentioned material preferably is 30° C. to 150° C., more preferably is 50° C. to 130° C., particularly preferably is 70° C. to 120° C.

The liquid crystal material is, for example, a liquid crystal polymer and preferably is a mixture of a cholesteric liquid crystal polymer or a nematic liquid crystal polymer and a chiral agent. Such a liquid crystal polymer is not particularly limited but can be selected suitably. Examples thereof include liquid crystal polymers whose principal chain is polyester, side-chain type liquid crystal polymers including an acrylic principal chain, a methacrylic principal chain, a siloxane principal chain or the like, nematic liquid crystal polymers containing a low molecular weight chiral agent, liquid crystal polymers containing a chiral component, a mixture liquid crystal polymer of a nematic liquid crystal polymer and a cholesteric liquid crystal polymer, and a mixture thereof. More specifically, the liquid crystal polymer disclosed in JP 8(1996)-239496 A can be used. Furthermore, the nematic liquid crystal polymer can be that described above, for example.

Other than the above-described liquid crystal polymers, a cholesteric low molecular weight liquid crystal (a liquid crystal monomer) also can be used as the liquid crystal material. Also, a nematic liquid crystal monomer or a polymeric mesogenic compound or the like can be used with a chiral agent. The nematic liquid crystal monomer can be, for example, a monomer disclosed in JP 8(1996)-239496 A. The polymeric mesogenic compound is not particularly limited but can be, for example, those disclosed in WO 93/22397, EP 0261712, DE 19504224, DE 4408171 and GB 2280445. More specifically, trade name LC242 (manufactured by BASF AG), trade name E7 (manufactured by Merck Ltd.) and trade name LC-Silicone-CC3767 (manufactured by Wacker-Chemie GmbH). The chiral agent is not particularly limited either, but can be synthesized by a method described in WO 98/00428, for example. More specifically, non-polymeric chiral compounds such as trade name S101, trade name R811, trade name CB15 (manufactured by Merck Ltd.) or a chiral agent such as trade name LC756 (manufactured by BASF AG) can be used.

The method for manufacturing the circularly polarized light separation layer is not particularly limited but can be a conventionally known method. A specific example includes the following method.

When the cholesteric liquid crystal polymer is used as a material, the liquid crystal polymer is expanded on an alignment substrate so as to form a liquid crystal layer, aligning the liquid crystal polymer in the liquid crystal layer, and then fixing the orientation.

The alignment substrate can be, for example, an alignment layer obtained by forming a film of polyimide, PVA, polyester, polyarylate, polyamide imide, polyetherimide, polysulfone, polyethersulfone, epoxy resins on a base having a birefringence retardation as small as possible such as TAC or amorphous polyolefin and rubbing the surface of this film with a rayon cloth or the like or an alignment layer obtained by forming an obliquely deposited layer of $SiO_2$ on the similar base. Other than the above, a substrate provided with a liquid crystal alignment capability by stretching a polyethylene terephthalate (PET) film or a polyethylene naphthalate (PEN) film, a substrate provided with a fine roughness having a fine aligning force by further treating the surface of the stretched film with a rubbing cloth or abrasives such as colcothar, or a substrate obtained by forming an alignment layer generating an aligning force by light irradiation such as azobenzene compounds on the stretched film also can be used.

The polymer may be expanded onto the alignment substrate in a heated and melted state or expanded as a polymer solution obtained by dissolving or dispersing the polymer in a solvent. There is no particular limitation on the solvent, and examples thereof includes chlorinated solvents such as methylene chloride, trichloroethylene and tetrachloroethane, ketone-based solvents such as acetone, methyl ethyl ketone (MEK) and cyclohexanone, aromatic solvents such as toluene, cyclic alkane such as cycloheptane, amide-based solvents such as N-methylpyrrolidone, and ether-based solvents such as tetrahydrofuran. They may be used alone or in combination. Moreover, the expanding method is not limited either but can be a conventionally known method such as spin coating, roller coating, flow coating, printing, dip coating, film flow-expanding, bar coating or gravure printing. At the time of expanding, a laminating method of attaching a cholesteric liquid crystal layer via an alignment layer also can be adopted, as necessary.

The method for fixing the orientation of the liquid crystal polymer is not particularly limited but can be selected suitably according to the kinds of the liquid crystal polymer. In the case where the liquid crystal polymer is a glassy liquid crystal, for example, a formed liquid crystal layer is heated to a temperature at least a glass transition temperature and lower than an isotropic phase transition temperature so as to cause a cholesteric orientation (a planar orientation), and then cooled down to the temperature lower than the glass transition temperature so as to form a glassy state, thereby fixing the orientation. Depending on the kind of the liquid crystal polymer, the orientation also may be fixed by an irradiation of energy such as ultraviolet rays or ion beams.

On the other hand, in the case of using the liquid crystal monomer as a material, after causing a cholesteric orientation in the liquid crystal layer as in the liquid crystal polymer, the monomer may be polymerized by irradiating with ultraviolet rays or heating, thereby fixing the orientation. More specifically, when the above-mentioned liquid crystal monomer (or the polymeric mesogenic compound) and the chiral agent are used, they are allowed to react to each other so as to cause a cholesteric orientation, and then polymerized, thereby fixing the orientation. In the case of using the liquid crystal monomer as described above, the polymerization produces non-liquid crystalline polymer. However, since its constituent molecules have a cholesteric structure as described above, the polymer shows a circularly polarized light separating function.

The circularly polarized light separation layer that has been formed on the alignment substrate can be used after being peeled off from the substrate. After a laminate of the circularly polarized light separation layer and the substrate may be made to adhere to another substrate via a pressure sensitive adhesive or the like, the substrate of the laminate may be peeled off, thereby transferring the circularly polarized light separation layer to the another substrate. Also, when the alignment substrate is transparent and has a small birefringence, for example, the circularly polarized light separation layer and the substrate may be used as they are laminated. In this case, the substrate also can serve as a surface protective film. When the circularly polarized light separation layer and the substrate are used as a laminate, it may be held by one layer or two or more layers of support depending on the strength of the circularly polarized light separation layer, for example. When using the two or more layers of support, a non-oriented film can be used for preventing changes in the polarization state. In the case of using an oriented film, the retardation preferably is as small as possible as in a TAC film having a small birefringence.

When forming the circularly polarized light separation layer, various additives such as a stabilizer, a plasticizer, metal and the like may be blended suitably in the material such as the liquid crystal material described above.

The thickness of the circularly polarized light separation layer is, for example, 0.5 to 100 μm, preferably 1 to 70 μm, and particularly preferably 1 to 50 μm considering the prevention of orientation irregularities and transmittance drop and the selective reflection property (the wavelength range presenting circular dichroism) etc. of the liquid crystal material. Additionally, this circularly polarized light separation layer may be formed of a single layer or be a laminate of two or more layers, for example.

The brightness enhancement film in the present invention can be manufactured by, for example, laminating one of the first and second λ/4 plates described above and the circularly polarized light separation layer. The laminating method is not particularly limited, but they can be integrated via an adhesive layer such as a pressure sensitive adhesive or an adhesive. Incidentally, there is no particular limitation on the pressure sensitive adhesive and the adhesive, and those described below can be used.

In the brightness enhancement film in the present invention manufactured as above, the circularly polarized light separation layer perpendicularly transmits predetermined circularly polarized light and the λ/4 plate converts the transmitted circularly polarized light into linearly polarized light. Thus, when the brightness enhancement film is used in combination with an absorptive dichroic polarizing plate, which will be described below, it is possible to suppress the absorption of the polarized light transmitted by the brightness enhancement film, in the absorptive dichroic polarizing plate. Furthermore, predetermined light is transmitted obliquely by the circularly polarized light separation layer so as to be converted into elliptically polarized light, thereby compensating for a phase of the light whose color has changed and thus reducing the color change, so that a middle tone with less coloring can be viewed through the polarizing plate.

Next, the polarizing plate in the optical film of the present invention will be described. The polarizing plate preferably is an absorptive polarizing plate, and particularly preferably is a polarizing film presenting absorptive dichroism (an absorptive dichroic polarizing film). Moreover, it also is possible to use a laminate in which a transparent protective layer is provided on at least one surface of the film. The total thickness of this absorptive dichroic polarizing plate usually is 90 to 200 μm.

The absorptive dichroic polarizing film is not particularly limited but can be a conventionally known film, which can be prepared by, for example, allowing a polymer film to adsorb a dichroic material such as iodine or a dichroic dye, followed by cross-linking, stretching and drying. Especially, films having excellent light transmittance and polarization degree are preferable. Examples of the polymer film in which the dichroic material is to be adsorbed include hydrophilic polymer films such as PVA-based films, partially-formalized PVA-based films, partially-saponified films based on ethylene-vinyl acetate copolymer and cellulose-based films. Other than the above, polyene oriented films such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The transparent protective layer is not particularly limited but can be a conventionally known transparent protective film. For example, transparent protective films having excellent transparency, mechanical strength, thermal stability, moisture shielding property and isotropism are preferable. Specific examples of materials for such a transparent protective layer can include cellulose-based resins such as TAC, and transparent resins based on polyester, polynorbornene, polycarbonate, polyamide, polyimide, polyethersulfone, polysulfone, polystyrene, polyolefin, acrylic substances, acetate and the like. Thermosetting resins or ultraviolet-curing resins based on the acrylic substances, urethane, acrylic urethane, epoxy, silicones and the like can be used as well. They can be used alone or in combination. Among them, a TAC film having a surface saponified with alkali or the like is preferable in light of the polarization property and durability.

Moreover, the polymer film described in JP 2001-343529 A (WO 01/37007) also can be used. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methyl maleimide and an acrylonitrile-styrene copolymer. Alternatively, the polymer film may be formed by extruding the resin composition.

It is preferable that the transparent protective layer is colorless. More specifically, a retardation value (Rth) of the layer in its thickness direction as represented by the equation below preferably ranges from −90 nm to +75 nm, more preferably ranges from −80 nm to +60 nm, and particularly preferably ranges from −70 nm to +45 nm. When the retardation value (Rth) is within the range of −90 nm to +75 nm, coloring (optical coloring) of the absorptive dichroic polarizing plate, which is caused by the protective film, can be solved sufficiently. In the equation below, nx, ny and nz are refractive indices of the X axis, the Y axis and the Z axis as described above, and d indicates the thickness of this film.

$$Rth=\{[(nx+ny)/2]-nz\}\cdot d$$

It also is possible to use a transparent protective layer prepared by incorporating transparent fine particles in the above-described transparent protective layer so as to provide microscopic asperities. Such transparent fine particles may be inorganic fine particles of silica, alumina, titania, zirconia, stannic oxide, indium oxide, cadmium oxide, antimony oxide or the like having an average particle diameter of 0.5 to 5 µm. They may have an electrical conductivity. Furthermore, organic fine particles such as crosslinked or uncrosslinked polymer particles can be used as well. Moreover, the transparent protective layer may be subjected to a hard coating treatment, an antireflection treatment and an anti-glare treatment. Incidentally, in the case where the transparent protective layer is arranged on both surfaces of the absorptive dichroic polarizing film, the layers may be the same or different.

The thickness of the transparent protective layer is not particularly limited but usually is 500 µm or smaller, preferably ranges from 5 to 300 µm, and more preferably ranges from 5 to 150 µm.

The optical film of the present invention can be manufactured by laminating the polarizing plate and the brightness enhancement film. There is no particular limitation on the laminating method, and it is appropriate to bond them via the adhesive layer such as the pressure sensitive adhesive or the adhesive described above. The optical film of the present invention uses the above-described λ/4 plate, so that even when the polarizing plate serving as a constituent shrinks owing to heating, it is possible to maintain the function of the λ/4 plate and further the function of the brightness enhancement film, thus preventing variations in chromaticity and brightness. In other words, the λ/4 plate in the brightness enhancement film converts circularly polarized light into linearly polarized light so as to equalize the polarization state over the entire wavelengths, thereby supplying light to the polarizing plate with less color changes.

When laminating the polarizing plate and the brightness enhancement film, an angle that a polarization axis of the polarizing plate forms with an in-plane slow axis (the X axis) or an in-plane fast axis (the Y axis) of the λ/4 plate can be determined suitably according to the retardation characteristics of the λ/4 plate, the property of circularly polarized light entering the λ/4 plate, or the like. More specifically, it is preferable that the polarization direction of the light that has been converted into linearly polarized light by the λ/4 plate and the transmission axis of the polarizing plate are brought as parallel as possible for improving an efficiency of light utilization.

When the optical film of the present invention is put in an actual use, other optical layers may be laminated thereon. Such optical layers are not particularly limited but can be conventionally known layers used for forming a liquid crystal display, for example, a reflection plate, a semi-transmission reflection plate, a retardation plate and a viewing angle compensating film. The optical layers may be used alone or in combination.

In the present invention, there is no particular limitation on the methods for laminating each constituent member, and conventionally known adhesives or pressure sensitive adhesives can be used. The kind thereof can be determined suitably depending on materials of the constituent members, for example. The pressure sensitive adhesives can be a transparent pressure sensitive adhesive having an excellent stress relaxation property, for example, a synthetic rubber or a polymer such as an acrylic polymer, a silicone-based polymer, polyester, polyurethane or polyether. Especially, an acrylic pressure sensitive adhesive is preferable in view of optical transparency, sticking characteristics and weather resistance. The above-described adhesives and pressure sensitive adhesives can be applied to surfaces of constituent members to form a layer, by which the constituent members are bonded to each other. The thickness of this layer is not particularly limited but can be determined suitably. For example, it generally is 1 to 500 µm, preferably 2 to 200 µm, and particularly preferably 5 to 100 µm considering adhesiveness and the reduction of thickness. In addition, conventionally known additives, for example, a tackifier such as a petroleum resin, a rosin-based resin, a terpene resin, a coumarone-indene resin, a phenolic resin, a xylene resin or a alkyd resin, a softener such as phthalic ester, phosphate ester, chlorinated paraffin, polybutene or polyisobutylene, or other fillers or antioxidants of various types may be blended into the above-mentioned adhesive layer as necessary.

Moreover, it is preferable that the optical film of the present invention further has a pressure sensitive adhesive layer, which allows easier lamination onto the other members such as a liquid crystal cell. The pressure sensitive adhesive layer can be arranged on one surface or both surfaces of the optical film. The material for the pressure sensitive adhesive layer is not particularly limited but can be a conventionally known material such as acrylic polymers. Further, the pressure sensitive adhesive layer having a low moisture absorption coefficient and an excellent heat resistance is preferable from the aspects of prevention of foaming or peeling caused by moisture absorption, prevention of degradation in the optical properties and warping of a liquid crystal cell caused by difference in thermal expansion coefficients and formation of an image display apparatus with high quality and excellent durability. It also may be possible to incorporate fine particles into a pressure sensitive adhesive so as to form the pressure sensitive adhesive layer showing light diffusion property.

In the case where a surface of the pressure sensitive adhesive layer is exposed, it is preferable to cover the surface with a liner. This makes it possible to prevent the pressure sensitive adhesive layer from being contaminated until the pressure sensitive adhesive layer is mounted on the liquid crystal cell. The liner can be formed by, for example, providing a suitable film such as the above-mentioned transparent protective film with a release coat such as a silicone-based release agent, a long-chain alkyl-based release agent, a fluorocarbon release agent or molybdenum sulfide, as necessary.

Next, the configuration of the optical film of the present invention will be illustrated, but it should be noted that the present invention is not limited to the following description. FIGS. 1 to 5 are sectional views showing examples of the optical film of the present invention, with the same parts assigned with the same reference numerals.

A first optical film shown in FIG. 1 has a polarizing plate 1 and a brightness enhancement film 2. The brightness enhancement film 2 is a laminate in which a λ/4 plate 20 and a circularly polarized light separation layer 30 are layered via an adhesive layer 4. The polarizing plate 1 and the brightness enhancement film 2 are layered via an adhesive layer 4 such that the λ/4 plate 20 faces toward the polarizing plate 1.

Figure 2:
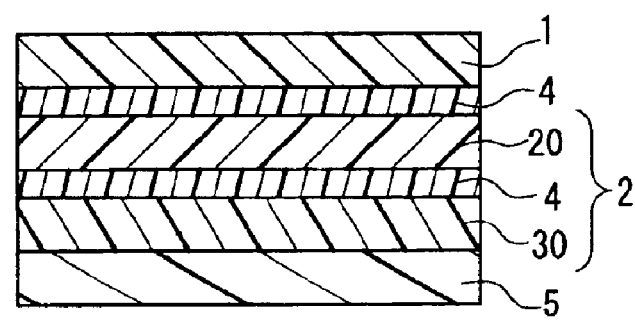
FIG. 2 shows a cross-section of an optical film according to another embodiment of the present invention.

A second optical film shown in FIG. 2 has the same configuration as the first optical film except that a protective film 5 further is disposed on an outer side of the circularly polarized light separation layer 30. This protective film 5 may be provided by using a transparent alignment substrate, which is used at the time of forming the circularly polarized light separation layer 30 (for example, a cholesteric liquid crystal layer), so as to have a function of surface protection as well. Alternatively, it may be provided by disposing a protective film via another adhesive layer.

Figure 3:
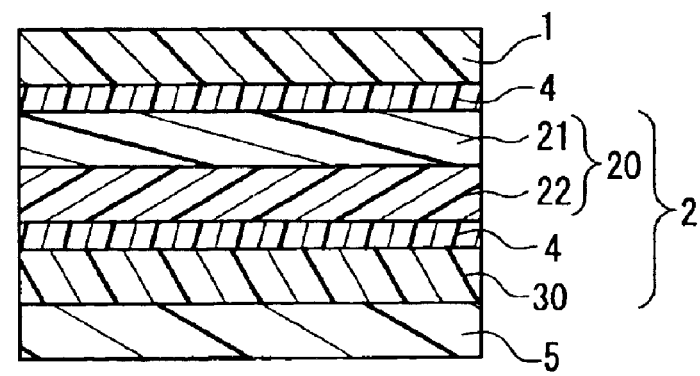
FIG. 3 shows a cross-section of an optical film according to yet another embodiment of the present invention.

A third optical film shown in FIG. 3 has the same configuration as the second optical film except the following points. That is, the λ/4 plate 20 is a laminate of a retardation film (λ/4 film) 21 satisfying the formula (III) and a liquid crystal layer 22 satisfying the formula (IV), and the circularly polarized light separation layer 30 is laminated thereon so as to face toward the liquid crystal layer 22 of the λ/4 plate 20 via the adhesive layer 4, thus forming the brightness enhancement film 2. Further, the brightness enhancement film 2 is laminated on the polarizing plate 1 via the adhesive layer 4. At this time, the brightness enhancement film is laminated on the polarizing plate 1 so that the retardation film 21 faces toward the polarizing plate 1. In addition, the surface protective film 5 is laminated on the other surface of the circularly polarized light separation layer 30.

Figure 4:
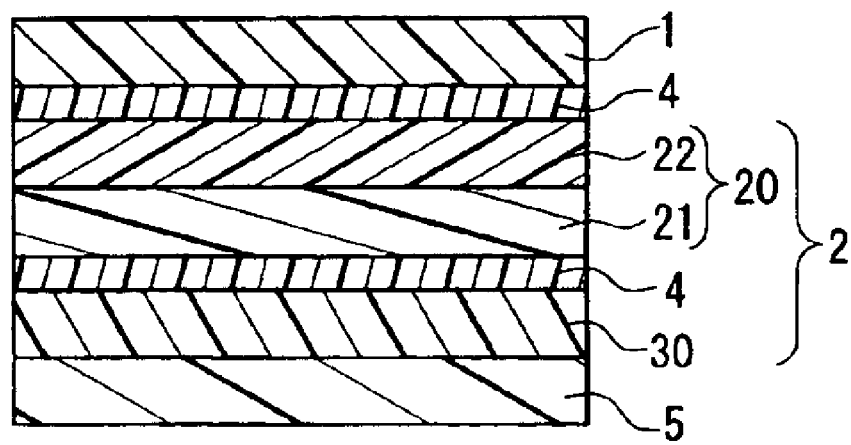
FIG. 4 shows a cross-section of an optical film according to yet another embodiment of the present invention.

As shown in FIG. 4, a fourth optical film has a configuration that the arrangement in the λ/4 plate 20 in the third optical film is inverted. In other words, the retardation film 21 of the λ/4 plate 20 is laminated so as to face not toward the polarizing plate 1 but toward the circularly polarized light separation layer 30 via the adhesive layer 4, and the liquid crystal layer 22 of the λ/4 plate 20 is laminated so as to face toward the polarizing plate 1 via the adhesive layer 4.

Although not shown in the figures, a pressure sensitive adhesive layer for allowing lamination onto the other optical members preferably is formed on one exposed surface of the polarizing plate 1 in these optical films.

The optical film of the present invention can be used in various image display apparatus such as liquid crystal displays and EL displays. The method of using such image display apparatus and the arrangement thereof can be similar to those of a conventional image display apparatus except that the optical film of the present invention is used.

Figure 5:
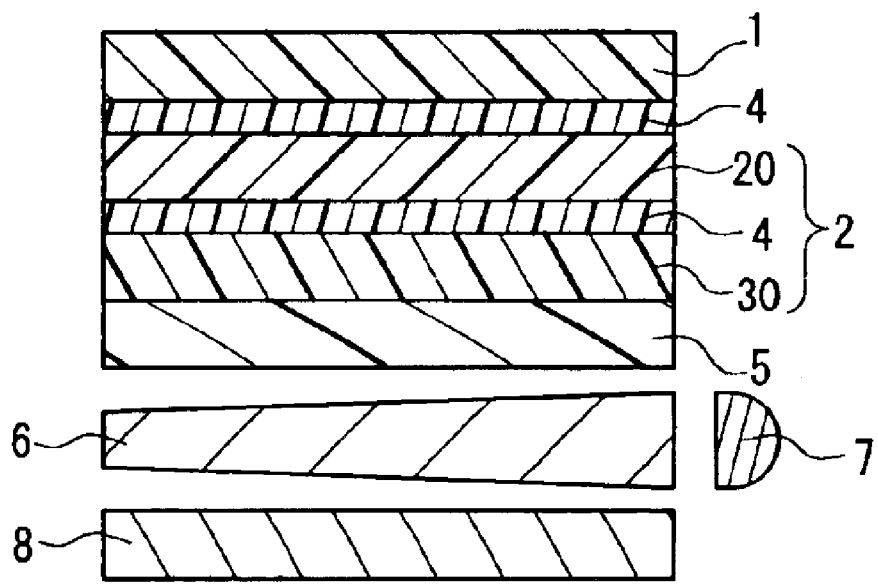
FIG. 5 shows a cross-section of an optical film according to yet another embodiment of the present invention.

An example of arranging the optical film of the present invention in a liquid crystal display will be illustrated. FIG. 5 is a sectional view showing the arrangement of a backlight unit and a backlight side polarizing plate of a liquid crystal unit in a liquid crystal display, which uses the first optical film shown in FIG. 1 as an optical film. As shown in the figure, a lateral side of a light conducting plate 6 is provided with a light source 7, while one surface thereof is provided with a reflection plate 8. The first optical film is arranged such that the circularly polarized light separation layer 30 of the brightness enhancement film 2 faces toward the other surface (on a viewing side) of the light conducting plate 6. Incidentally, the other surface of the first optical film, namely, the side of the polarizing plate 1 is arranged on the side opposite to the viewing side of the liquid crystal cell.

In accordance with the liquid crystal display in which the optical film of the present invention is arranged as described above, light generated in the light source 7 and emitted from the surface of the light conducting plate 6 is separated into a vertical polarization component and a horizontal polarization component in the circularly polarized light separation layer 30 arranged on the front side of the light conducting plate 6. More specifically, the circularly polarized light separation layer 30 performs this separating function to transmit predetermined circularly polarized light and reflect other circularly polarized light. The light transmitted by the circularly polarized light separation layer 30 is converted into linearly polarized light via the λ/4 plate 20 aminated on the circularly polarized light separation layer 30 and enters the polarizing plate 1. This converted light mostly passes through the polarizing plate 1 without being absorbed if its linear polarization direction matches a transmission axis of the polarizing plate 1. On the other hand, the light reflected by the circularly polarized light separation layer 30 enters the light conducting plate 6 again, is reflected by the reflection plate 8 arranged on the back side of the light conducting plate 6, and reaches as returned light the circularly polarized light separation layer 30 again. When the returned light is reflected by the reflection plate 8, the polarization state thereof changes, and therefore, its polarization is inverted, so that the polarized light has the orthogonal polarization, or canceled, so that the returned light becomes natural light and further is separated in the circularly polarized light separation layer 30. As described above, since light are separated, reflected and polarized repeatedly by the circularly polarized light separation layer, the light conducting plate, the reflection plate etc., it is possible to reuse light that is otherwise absorbed in the polarizing plate and lost. Consequently, the efficiency of light utilization improves, and the brightness also improves.

In the present example, the light conducting plate preferably is provided with a reflection plate on its back as described above so as to diffuse, reflect, diffract and interfere with the light conducted in the light conducting plate and emit it from the front side of the light conducting plate and to emit light efficiently without absorbing it. The light source is not particularly limited but can be, for example, a light emitting diode or a linear light source such as a cold cathode ray tube or a hot cathode ray tube. The backlight is not limited to the side light type light conducting plate described above but can be selected suitably.

The light conducting plate for emitting light from its one surface is not particularly limited but can be a conventionally known light conducting plate. For example, it is possible to use a light conducting plate obtained by providing a diffuser in a dotted or striped manner on a light emitting surface or a back surface of a transparent or semi-transparent resin plate or a light conducting plate obtained by providing asperities on the back surface.

Although the light conducting plate itself has a function of converting the polarization state of light reflected by the circularly polarized light separation layer, a reflection plate preferably is disposed on the back surface of the light conducting plate as described above so that a reflection loss can be prevented highly efficiently. Such a reflection plate preferably is a diffuse reflector plate or a specular reflector plate, for example, because of its excellent function of converting the reflected light. The diffuse reflector plate generally has a rough surface and, according to its diffusion characteristics, can cancel the polarization state of randomly polarized light. The specular reflector plate has a surface provided with a metal surface such as a metal foil or a deposition film of aluminum, silver or the like and can reflect circularly polarized light and invert its polarization state.

It also may be possible to provide a further diffusion plate between the reflection plate and the brightness enhancement film, which is a laminate of the λ/4 plate and the circularly polarized light separation layer, more specifically, between the light conducting plate and the brightness enhancement film. The polarized light reflected by the brightness enhancement film is directed toward the reflection plate on the backside of the light conducting plate as described above, but the diffusion plate arranged between the brightness enhancement film and the reflection plate diffuses the polarized light uniformly and cancels its polarization state to turn it into non-polarized light. In other words, the light returns to the original state of natural light. Then, this non-polarized light (natural light) is reflected by the reflection plate, and the returned light passes through the diffusion plate again and enters the brightness enhancement film again, repeatedly. In this manner, according to the arrangement of the diffusion plate for turning the polarized light back to the natural light, it is possible to maintain brightness of the display screen and reduce brightness irregularities, thereby providing a display screen with more uniform brightness. This is because, according to the arrangement of the diffusion plate, the number of repeated reflections of the first incident light increases appropriately, accompanied with the diffusion function of the diffusion plate, thus achieving a display with uniform brightness.

The light reflected by the circularly polarized light separation layer is trapped between the circularly polarized light separation layer and the reflection plate and reflected repeatedly therebetween, and accordingly, its polarization state is converted so as to be able to pass through the circularly polarized light separation layer. Then, this light is emitted with the originally transmitted light of the incident light toward the polarizing plate, thereby using the light more efficiently without being affected by a reflection loss.

With regard to the light conducting plate, other than the above-described diffraction plate, it is possible to suitably combine and arrange, for example, a prism sheet, a prism array sheet, a lens array sheet for controlling light emitting direction, reflection means for recovering leakage light and auxiliary means such as a light source holder for directing light emitted from the light source to the lateral surface of the light conducting plate, as necessary. Incidentally, the diffusion plate or the prism sheet that is arranged on the front side (light emitting side) of the light conducting plate and dots that are formed on the light conducting plate can function as a polarization converting means for changing the phase of reflected light with a diffusion effect or the like.

The size of the optical film of the present invention is not particularly limited but can be determined suitably according to the size of a display screen. However, since the optical film of the present invention can suppress variations in brightness and chromaticity as described above, the effects thereof is considerable when being mounted on a large-screen image display apparatus. Thus, the size of the optical film is not particularly limited and preferably is 250 mm or longer, diagonally, and more preferably 350 mm or longer. Incidentally, the upper limit is not particularly limited.

Next, the liquid crystal display of the present invention is characterized in that the above-described optical film of the present invention is arranged at least on one surface of a liquid crystal cell. The liquid crystal display of the present invention can have a configuration and an arrangement similar to those of a conventionally known liquid crystal display without any specific limitations except that the optical film of the present invention is used.

It is preferable that the optical film of the present invention in the above-mentioned liquid crystal display is arranged on a back side (a backlight side) of the liquid crystal cell for producing the above-mentioned effects. The direction toward which the optical film faces also can be similar to that in a conventionally known apparatus. For example, as shown in FIG. 5, the brightness enhancement film, the polarizing plate and the liquid crystal cell are arranged in this order from the side of the light conducing plate. It is preferable that the circularly polarized light separation layer side of the brightness enhancement film faces toward the light conducting plate.

In the present invention, various optical members (the optical film, the light conducting plate, the reflection plate, etc.) can be layered and integrated via an adhesive or a pressure sensitive adhesive as necessary. This is effective in preventing the display quality from lowering by suppressing a reflection loss at interfaces between these members and intrusion of foreign substances into the interfaces and in preventing the compensation efficiency and polarization conversion efficiency from lowering due to displacement of the optical members. The above-noted adhesive or pressure sensitive adhesive may be conventionally known and, in particular, preferably is a pressure sensitive adhesive, which is excellent in stress relaxation, for example. This is because the pressure-sensitive adhesive suppresses stress generated in the optical film owing to heat in the light source, thus preventing changes in refractive index caused by photoelastic deformation, contributing to the formation of a liquid crystal display that achieves excellent brightness and visibility and reliable display quality. There is no particular limitation on the adhesive, the pressure sensitive adhesive and the thicknesses thereof, and they may be similar to the above, for example.

In the present invention, the optical film of the present invention and various members constituting the same (the polarizing plate, the circularly polarized light separation layer, the λ/4 plate), the light conducting plate, the adhesive layer and other members may be treated with an UV absorber such as salicylate ester compounds, benzophenolic compounds, benzotriazole compounds, cyanoacrylate compounds or nickel complex salt-based compounds, thus providing an UV absorbing capability.

As described above, the optical film of the present invention can be arranged on one surface of the liquid crystal cell so as to be applied to, for example, a reflection-type, semi-transmission-type or transmission and reflection type liquid crystal display.

The kind of the liquid crystal cell forming the liquid crystal display is not particularly limited but can be any type of liquid crystal cells such as an active-matrix driving type represented by a thin-film transistor (TFT) type, or a simple-matrix driving type represented by a TN (twisted nematic) type or a STN (super twisted nematic) type. The liquid crystal cell using a non-twisted liquid crystal, a guest host liquid crystal in which a dichroic material is dispersed, or a ferroelectric liquid crystal also can be used. Among the above, the optical film of the present invention preferably is used as the liquid crystal cell whose display system is a TN type, an STS type or an OCB (Optically Aligned Birefringence) type. Even in the case of a VA (Vertically aligned) type liquid crystal cell, the optical film of the present invention also can be applied as long as the liquid crystal has a monodomain orientation.

In the liquid crystal display of the present invention, one or more layers of a light diffusion plate, an anti-glare layer, an antireflection film, a protective layer or a protective plate further may be disposed on the polarizing plate on the viewing side.

The optical film of the present invention can be used not only in the above-described liquid crystal display but also in, for example, self-light-emitting displays such as an organic electroluminescence (EL) display, a PDP, a plasma display (PD) and a field emission display (FED). When using the optical film of the present invention in these image display apparatus, there is no particular limitation except that a conventional laminate of the absorptive dichroic polarizing plate and the brightness enhancement film is replaced with the optical film of the present invention, and conventionally known configuration and arrangement can be applied.

EXAMPLES

The following is a more specific description of the present invention by way of examples and comparative examples, though the present invention is by no means limited to the examples below.

Examples A and Comparative Example A

Example A-1

First, a 30 µm-thick PVA film containing iodine was prepared as an absorptive dichroic polarizing film. On both surfaces of this polarizing film, a 40 µm-thick TAC film was attached as a transparent protective film with a PVA-based adhesive, thereby producing a polarizing plate having a total thickness of 110 µm.

Next, a brightness enhancement film including a circularly polarized light separation layer and a λ/4 plate was produced in the following manner. First, a cholesteric liquid crystal polymer represented by the formula (1) below (manufactured according to JP 8(1996)-239496 A) was mixed into cyclohexanone, thus preparing a 30 wt % liquid crystal polymer solution. In the formula (1), n:m=80:20, and the molecular weight was about 10,000. Then, this polymer solution was applied to a 40 µm-thick alignment base (a TAC film) and dried at 160° C. for 2 minutes, thereby forming a 50 μm-thick circularly polarized light separation layer in which a 6 μm-thick cholesteric liquid crystal polymer layer was laminated on the base.

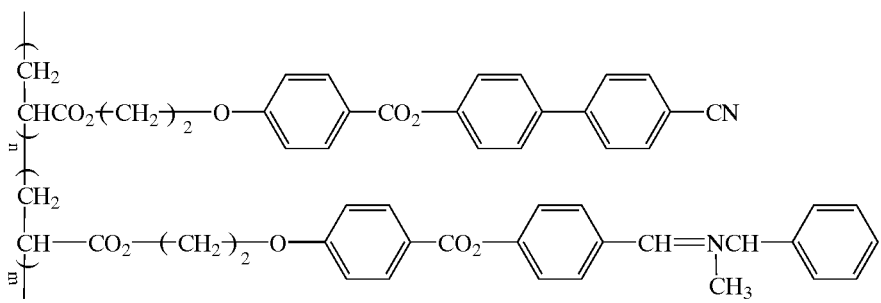

(1)

On the other hand, a 90 μm-thick modified polycarbonate transparent film (trade name WRF; manufactured by TEIJIN LIMITED) showing Δnd(450 nm)/Δnd(550 nm)=0.86 was used as a λ/4 film. This λ/4 film had a refractive index of "nx>ny=nz" and a photoelastic coefficient of $15.1 \times 10^{-12}$ $m^2/N$.

On this λ/4 film, a 30 wt % nematic liquid crystal polymer solution prepared by mixing a nematic liquid crystal polymer represented by the formula (2) below (manufactured according to JP2002-174724 A) into cyclopentanone was applied. In the formula (2), n:m=65:35, and the molecular weight was about 6,500. This applied film was dried at 80° C. for 2 minutes and further cross-linked and hardened by a UV irradiation. In this manner, the λ/4 plate in which a nematic liquid crystal layer was layered on the λ/4 film was produced. The nematic liquid crystal layer had a refractive index of "nz>nx≧ny." The λ/4 plate had a Δnd(450 nm)/Δnd(550 nm) of 0.86.

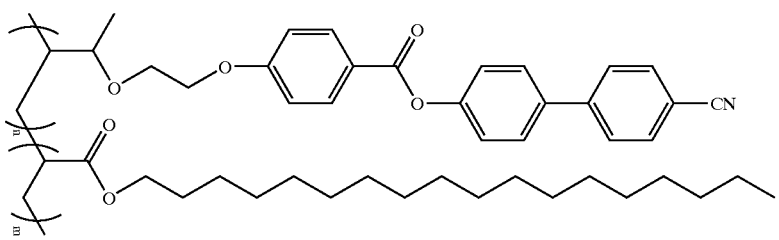

(2)

This λ/4 plate and the circularly polarized light separation layer were laminated with an acrylic pressure sensitive adhesive (manufactured by Nitto Denko Corporation), thus producing a 160 μm-thick brightness enhancement film. The above-noted lamination was carried out such that the nematic liquid crystal layer of the λ/4 plate and the cholesteric liquid crystal polymer layer of the circularly polarized light separation layer face each other.

Subsequently, the above-mentioned polarizing plate and the brightness enhancement film were laminated via a 25 μm-thick acrylic pressure sensitive adhesive layer, thereby producing an integrated optical film having a thickness of 310 μm. The polarizing plate and the brightness enhancement film were arranged such that the λ4 plate of the brightness enhancement film contacted the polarizing plate and an absorption axis of the polarizing plate and a stretching axis of the λ/4 plate met at an angle of 45°.

Example A-2

A 100 μm-thick diacetylcellulose film (manufactured by Nitto Denko Corporation) showing Δnd(450 nm)/Δnd(550 nm)=0.96 was stretched uniaxially to 1.4 times its original length and used as a λ/4 film with a thickness of 80 μm. A 300 μm-thick optical film was produced in a manner similar to Example A-1 except that this λ/4 film was used. The obtained λ/4 film and λ/4 plate each had a Δnd(450 nm)/Δnd(550 nm) of 0.96, and the ?λ/4 film had a photoelastic coefficient of $18.4 \times 10^{-12}$ $m^2/N$.

Example A-3

For preparing a λ/4 film, a 100 μm-thick norbornene-based polymer film (trade name ARTON; manufactured by JSR Corporation) showing Δnd(450 nm)/Δnd(550 nm)=1.01 was used as a transparent film and stretched uniaxially to 1.4 times its original length, thus preparing a λ/4 film with a thickness of 85 μm. Then, a 305 μm-thick optical film was produced in a manner similar to Example A-1 except that this λ4 film was used as the λ/4 plate with no nematic liquid crystal layer laminated thereon. The λ/4 plate had a Δnd(450 nm)/Δnd(550 nm) of 1.01 and a photoelastic coefficient of $4.1 \times 10^{-12}$ $m^2/N$.

Comparative Example A-1

For preparing a λ/4 film, a 70 μm-thick polycarbonate film (trade name Panlite; manufactured by TEIJIN LIMITED) showing Δnd(450 nm)/Δnd(550 nm)=1.08 was used as a transparent film and stretched uniaxially to 1.2 times its original length, thus preparing a λ/4 film with a thickness of 60 μm. Then, a 290 μm-thick optical film was produced in a manner similar to Example A-1 except that this λ/4 film was used as the λ/4 plate with no nematic liquid crystal layer laminated thereon. The λ/4 plate had a Δnd(450 nm)/Δnd(550 nm) of 1.08 and a photoelastic coefficient of $90.0 \times 10^{-12}$ $m^2/N$.

The following characteristics of the optical films of Examples A-1 to A-3 and Comparative Example A-1 produced as described above were evaluated. The results are shown in Tables 1 and 2 below.

(In-plane maximum chromaticity difference: Δxy(max))

Each of the optical films was cut in a 15-inch size (384 mm diagonally, 307.1 mm wide and 230.6 mm long) and attached onto one surface of a glass plate (310 mm wide and 260 mm long) with an acrylic pressure sensitive adhesive. This laminate was heated in an autoclave at 50° C. at $5.05 \times 10^5$ Pa for 15 minutes to facilitate adhesion to each other, and then treated under a heating condition at 70° C. for 120 hours. Thereafter, a backlight was disposed on a glass-plate-side surface of the resultant laminate, and chromaticity (x, y) in the optical film was measured using a luminance colorimeter (trade name: BM-5A manufactured by TOPCON CORPORATION). The measurement value was substituted into the formula below, thereby calculating an in-plane maximum chromaticity difference Δxy(max).

$$\Delta xy(max) = \sqrt{((x_{max} - x_{min})^2 + (y_{max} - y_{min})^2)}$$

$x_{max}$: in-plane maximum x
$x_{min}$: in-plane minimum x
$y_{max}$: in-plane maximum y
$y_{min}$: in-plane minimum y The chromaticity was measured at 1 point for every 8000 mm² of the 15-inch optical film, namely, at 9 points in total.

(Variation in Chromaticity)

Based on the results of the in-plane maximum chromaticity difference Δxy(max) described above, chromaticity variation was evaluated according to the standards below.

Excellent: extremely small in-plane chromaticity var. $0 \leq \Delta xy(max) \leq 0.003$
Good: small in-plane chromaticity var. $0.003 < \Delta xy(max) \leq 0.008$
No Good: large in-plane chromaticity var. $0.008 < \Delta xy(max) \leq 0.01$
Bad: extremely large in-plane chromaticity var. $0.01 < \Delta xy(max)$ (Dispersion characteristics with respect to normal incident light and inclined incident light)

With respect to the λ/4 plate used in each of the optical films, the retardations at wavelengths of 450 nm and 550 nm were measured with an automatic birefringence analyzer (Oji Scientific Instruments: trade name KOBRA-21ADH). The retardations were obtained by measuring an in-plane retardation (Δnd) with respect to incident light from a normal direction of the optical film and an in-plane retardation (Δnd') with respect to incident light from a direction inclined by 45° from the normal line. Then, from the results of the measurement, Δnd(450 nm)/Δnd(550 nm) and Δnd' (450 nm)/Δnd'(550 nm) were calculated.

(Variation in In-plane Retardation)

The λ/4 plate alone was removed from the optical film that had undergone the test of in-plane maximum chromaticity difference, and its retardation was measured using the automatic birefringence analyzer (trade name KOBRA-21ADH; Oji Scientific Instruments). Then, the variation in the retardation was measured by a conventionally known method.

TABLE 1

| | Dispersion characteristics | | Photoelastic coefficient |
|---|---|---|---|
| | Front * | Inclined by 45° ** | ×10⁻¹² (m²/N) |
| Example A-1 | 0.86 | 0.94 | 15.1 |
| Example A-2 | 0.96 | 1.01 | 18.4 |

TABLE 1-continued

| | Dispersion characteristics | | Photoelastic coefficient |
|---|---|---|---|
| | Front * | Inclined by 45° ** | ×10⁻¹² (m²/N) |
| Example A-3 | 1.01 | 1.03 | 4.1 |
| Comp. Example A-1 | 1.08 | 1.10 | 90.0 |

\* Δnd(450 nm) / Δnd(550 nm)
\*\* Δnd'(450 nm) / Δnd'(550 nm)

TABLE 2

| | Δxy(max) | Chromaticity variation | In-plane Δnd variation |
|---|---|---|---|
| Example A-1 | 0.002 | Excellent | 7 |
| Example A-2 | 0.004 | Good | 9 |
| Example A-3 | 0.002 | Excellent | 3 |
| Comp. Example A-1 | 0.018 | Bad | 23 |

As becomes clear from Tables 1 and 2, in Comparative Example, since the optical characteristics of the λ/4 plate in the brightness enhancement film did not satisfy Δnd(450 nm)/Δnd(550 nm)≦1.02, Δxy(max) was very large. In contrast, according to Examples in which the optical characteristics of the λ/4 plate satisfied Δnd(450 nm)/Δnd(550 nm)≦1.02, it was possible to set Δxy(max) to 0.008 or smaller even when the variation in in-plane retardation was large. As a result, it was possible to reduce the in-plane chromaticity variation and the in-plane Δnd variation. Furthermore, the optical film of the present invention made it possible to provide a liquid crystal display whose in-plane chromaticity does not change very much over time of use and that has a high durability.

Examples B and Comparative Examples B

Example B-1

First, a cholesteric liquid crystal polymer represented by the formula (1) above was mixed into cyclohexanone, thus preparing a 30 wt % liquid crystal polymer solution. Then, this polymer solution was applied to a 40 μm-thick base (a TAC film) and dried at 160° C. for 2 minutes, thereby forming a 50 μm-thick circularly polarized light separation layer in which a 6 μm-thick cholesteric liquid crystal polymer layer was laminated on the base.

On the other hand, a 100 μm-thick transparent film made of a norbornene-based polymer (trade name ARTON; manufactured by JSR Corporation) having a photoelastic coefficient of $4.1 \times 10^{-12}$ m²/N was prepared and stretched uniaxially to 1.4 times its original length, thus producing a λ/4 film with a thickness of 85 μm to be used as a λ/4 plate.

Then, an absorptive dichroic polarizing plate produced similarly to that in Example A-1, the λ/4 plate and the circularly polarized light separation layer were laminated in this order via 25 μm-thick pressure sensitive adhesive layers, thereby obtaining an integrated optical film. The λ/4 plate and the circularly polarized light separation layer constituted a brightness enhancement film, and they were laminated such that the λ/4 plate and the cholesteric liquid crystal polymer layer of the circularly polarized light separation layer face each other. Further, the absorptive dichroic polarizing plate and the λ/4 plate were arranged such that an absorption axis of the polarizing plate and a stretching axis of the λ/4 plate (the norbornene-based polymer film) met at an angle of 45°.

Example B-2

A 60 µm-thick modified polycarbonate film (manufactured according to JP 2001-55455 A) having a photoelastic coefficient of 27.8×10$^{-12}$ m$^2$/N was prepared and stretched uniaxially to 1.2 times its original length, thus producing a λ/4 film with a thickness of 50 µm. An optical film was produced in a manner similar to Example B-1 except that this λ/4 film was used as a λ/4 plate.

Example B-3

A transparent cycloolefin polymer film (trade name ZEONOR ZF14 type; manufactured by ZEON Corporation) having a photoelastic coefficient of 6.0×10$^{-12}$ m$^2$/N was prepared and stretched uniaxially, thus producing a λ/4 film with a thickness of 30 µm. An optical film was produced in a manner similar to Example B-1 except that this λ/4 film was used as a λ/4 plate.

Comparative Example B-1

A 70 µm-thick polycarbonate-based polymer film (trade name Panlite; manufactured by TEIJIN LIMITED) having a photoelastic coefficient of 90.0×10$^{-12}$ m$^2$/N was prepared and stretched uniaxially to 1.2 times its original length, thus producing a λ/4 film with a thickness of 75 µm. An optical film was produced in a manner similar to Example B-1 except that this λ/4 film was used as a λ/4 plate.

Comparative Example B-2

An absorptive dichroic polarizing film similar to that in Example A-1 was prepared. A 40 µm-thick TAC film was laminated on one surface of the absorptive dichroic polarizing film, while a TAC film provided with an anti-glare layer was laminated on the other surface thereof, thereby producing an absorptive dichroic polarizing plate having a total thickness of 115 µm. The anti-glare layer contained a silica-based filler and a UV curing resin, and the TAC film was arranged such that the anti-glare layer was exposed to the surface. On the other hand, a 70 µm-thick polycarbonate-based film (trade name Panlite; manufactured by TEIJIN LIMITED) having a photoelastic coefficient of 90.0×10$^{-12}$ m$^2$/N was prepared and stretched uniaxially to 1.2 times its original length, thus producing a λ/4 film with a thickness of 75 µm. An optical film was produced in a manner similar to Example B-1 except that this λ/4 film was used as a λ/4 plate and the absorptive dichroic polarizing plate was used.

Evaluations of the characteristics similar to those conducted in Examples A and the following evaluations were performed with respect to the optical films of Examples B-1, B-2, B-3 and Comparative Examples B-1, B-2. The results are shown in Table 3 below.

(Film Transmittance)

The transmittance of each of the optical films was measured using a high-speed spectrophotometer (trade name DOT-3; Murakami Color Research Laboratory). Then, the luminous factor was corrected in view of two-degrees-visual field XYZ system according to JIS Z 8701, thereby obtaining transmittance (Y value).

(Brightness Enhancement Factor)

The polarizing plate and the brightness enhancement film of each obtained optical film was measured for brightness. More specifically, the polarizing plate or the brightness enhancement film was put on a light table (manufactured by HAKUBA Photo Industry Co., Ltd.), and the brightness thereof was measured using a luminance meter (trade name BM-7; manufactured by TOPCON CORPORATION). Thereafter, the brightness for the polarizing plate (A) and the brightness for the brightness enhancement film (B) were substituted into the formula below, thereby calculating a brightness enhancement factor (%).

Brightness enhancement factor=(B/A)×100

TABLE 3

| | Δxy(max) | Chromaticity variation | Film transmittance (%) | Brightness enhancement factor (%) |
|---|---|---|---|---|
| Example B-1 | 0.002 | Excellent | 46.3 | 146 |
| Example B-2 | 0.006 | Good | 45.8 | 145 |
| Example B-3 | 0.002 | Excellent | 46.1 | 146 |
| Comp. Example B-1 | 0.018 | Bad | 46.0 | 145 |
| Comp. Example B-2 | 0.016 | Bad | 45.3 | 142 |

As shown in Table 3, the optical films of Comparative Examples whose λ/4 plate had a photoelastic coefficient of 90.0×10$^{-12}$ m$^2$/N showed extremely large Δxy(max) and large chromaticity variation. In contrast, since the optical films of Examples whose λ/4 plate had a photoelastic coefficient of 40.0×10$^{-12}$ m$^2$/N or smaller satisfied Δxy (max)≦0.008, the chromaticity variation was suppressed. Further, they were excellent in their film transmittance and brightness enhancement factor. Thus, it was confirmed that these optical films were extremely suitable for achieving excellent durability and enhanced brightness in various image display apparatus such as a liquid crystal display.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A quarter wavelength plate comprising:
    a retardation film satisfying nx$^r$>ny$^r$=nz$^r$, and
    a liquid crystal layer satisfying nz$^c$>nx$^c$≧ny$^c$,
    where "nx$^r$, ny$^r$, nz$^r$" and "nx$^c$, ny$^c$, nz$^c$" indicate refractive indices in an X-axis direction, a Y-axis direction and a Z-axis direction in the retardation film and the liquid crystal layer, respectively, with the X-axis direction being an axial direction exhibiting a maximum refractive index within a plane of the retardation film or the liquid crystal layer, the Y-axis direction being an axial direction perpendicular to the X axis within the plane and the Z-axis direction being a thickness direction perpendicular to the X axis and the Y axis.

2. A brightness enhancement film comprising a layer having a circularly polarized light separating function and the quarter wavelength plate according to claim 1.

3. An optical film comprising:
    a polarizing plate; and
    a brightness enhancement film comprising a layer having a circularly polarized light separating function, and a quarter wavelength plate;
    wherein the quarter wavelength plate comprises
    a retardation film satisfying nx$^r$>ny$^r$=nz$^r$, and
    a liquid crystal layer satisfying nz$^c$>nx$^c$≧ny$^c$,
    where "nx$^r$, ny$^r$, nz$^r$" and "nx$^c$, ny$^c$, nz$^c$" indicate refractive indices in an X-axis direction, a Y-axis direction and a Z-axis direction in the retardation film and the liquid crystal layer, respectively, with the X-axis direction being an axial direction exhibiting a maximum refractive index within a plane of the retardation film or the liquid crystal layer, the Y-axis direction being an axial direction perpendicular to the X axis within the plane and the Z-axis direction being a thickness direction perpendicular to the X axis and the Y axis, and wherein a maximum chromaticity difference $\Delta xy(max)$ of in-plane transmitted light of the optical film is about 0.008 or smaller after the optical film is attached to a glass plate and allowed to stand at 70° C. for 120 hours.

4. The optical film according to claim 3, wherein an in-plane retardation ($\Delta nd$) with respect to incident light from a normal direction of the quarter wavelength plate satisfies $$\Delta nd(450\ nm)/\Delta nd(550\ nm) \leq 1.02,$$

where $\Delta nd$ is $(nx-ny)\cdot d$, nx and ny respectively represent refractive indices in an X-axis direction and a Y-axis direction in the quarter wavelength plate, with the X-axis direction being an axial direction exhibiting a maximum refractive index within a plane of the quarter wavelength plate and the Y-axis direction being an axial direction perpendicular to the X axis within the plane, d represents a thickness of the quarter wavelength plate, $\Delta nd(450\ nm)$ represents an in-plane retardation at a wavelength of 450 nm, and $\Delta nd(550\ nm)$ represents an in-plane retardation at a wavelength of 550 nm.

5. The optical film according to claim 3, wherein an in-plane retardation ($\Delta nd'$) with respect to incident light from a direction inclined by 45° from a normal direction of the quarter wavelength plate satisfies $$\Delta nd'(450\ nm)/\Delta nd'(550\ nm) \leq 1.04,$$

where $\Delta nd'$ is $(nx'-ny')\cdot d$, nx' and ny' respectively represent refractive indices in an X'-axis direction and a Y'-axis direction with respect to the incident light from the direction inclined by 45° from the normal direction (a Z'-axis direction) of the quarter wavelength plate, with the X'-axis direction being an axial direction within a plane of the quarter wavelength plate perpendicular to an incident direction of the incident light inclined by 45° from the Z'-axis direction and the Y'-axis direction being a direction perpendicular to the incident direction and the X'-axis direction, d represents a thickness of the quarter wavelength plate, $\Delta nd'(450\ nm)$ represents an in-plane retardation at a wavelength of 450 nm, and $\Delta nd'(550\ nm)$ represents an in-plane retardation at a wavelength of 550 nm.

6. The optical film according to claim 3, wherein the quarter wavelength plate is a film comprising a polymer having a photoelastic coefficient of $40 \times 10^{-12}$ m$^2$/N or smaller.

7. The optical film according to claim 6, wherein the quarter wavelength plate is a liquid crystal layer comprising a nematic liquid crystal.

8. The optical film according to claim 3, wherein constituent molecules of the layer having the circularly polarized light separating function are oriented in such a manner as to have a cholesteric structure.

9. The optical film according to claim 8, wherein the layer having the circularly polarized light separating function is a cholesteric liquid crystal layer.

10. The optical film according to claim 3, wherein the polarizing plate and the brightness enhancement film are laminated via a pressure sensitive adhesive or an adhesive.

11. The optical film according to claim 3, having a diagonal length of 250 mm or larger.

12. The optical film according to claim 3, wherein the $\Delta xy(max)$ is 0.005 or smaller.

13. The optical film according to claim 3, wherein the $\Delta xy(max)$ is 0.003 or smaller.

14. A liquid crystal display comprising:
the optical film according to claim 3; and
a liquid crystal cell;
wherein the optical film is disposed on at least one surface of the liquid crystal cell.

15. An image display apparatus comprising the optical film according to claim 3.

* * * * *